(12) United States Patent
Hussain

(10) Patent No.: US 9,815,663 B2
(45) Date of Patent: Nov. 14, 2017

(54) ELECTRICAL WIRE ORGANIZATION DEVICE

(71) Applicant: Zahid Hussain, Cathedral City, CA (US)

(72) Inventor: Zahid Hussain, Cathedral City, CA (US)

(*) Notice: Subject to any disclaimer, the term of this patent is extended or adjusted under 35 U.S.C. 154(b) by 0 days.

(21) Appl. No.: 14/538,218

(22) Filed: Nov. 11, 2014

(65) Prior Publication Data
US 2015/0129446 A1    May 14, 2015

Related U.S. Application Data

(60) Provisional application No. 61/962,603, filed on Nov. 12, 2013.

(51) Int. Cl.
| | | |
|---|---|---|
| *H01R 25/00* | (2006.01) | |
| *H01R 13/00* | (2006.01) | |
| *H01R 13/72* | (2006.01) | |
| *B65H 75/36* | (2006.01) | |
| *H02G 11/02* | (2006.01) | |

(52) U.S. Cl.
CPC ........... *B65H 75/362* (2013.01); *H01R 13/72* (2013.01); *B65H 2701/34* (2013.01); *H01R 25/006* (2013.01); *H02G 11/02* (2013.01)

(58) Field of Classification Search
USPC ......... 229/115, 120.32, 122, 126; 242/588.3; 53/430, 467; 361/826, 601, 679.02; 439/4, 13, 501, 502, 576, 490
See application file for complete search history.

(56) References Cited

U.S. PATENT DOCUMENTS

| | | | | |
|---|---|---|---|---|
| 1,831,444 A | * | 11/1931 | Gorsuch ............... | B65D 85/50 |
| | | | | 119/490 |
| 2,404,065 A | * | 7/1946 | Hill ...................... | B65D 5/4295 |
| | | | | 206/521.1 |
| 2,763,707 A | | 9/1956 | Soderberg | |
| 3,045,888 A | * | 7/1962 | Forrer .................... | B65D 5/14 |
| | | | | 229/120.32 |
| 3,134,525 A | * | 5/1964 | Holcombe ......... | B65D 83/0841 |
| | | | | 206/1.5 |
| 3,193,092 A | * | 7/1965 | Parsons .................... | A47F 7/17 |
| | | | | 206/394 |
| 3,530,980 A | * | 9/1970 | Link ........................ | B65D 5/22 |
| | | | | 206/394 |
| 3,730,418 A | * | 5/1973 | Spencer ............... | B65D 5/4295 |
| | | | | 119/497 |
| 4,088,262 A | * | 5/1978 | Kuehlhorn ........... | B65D 5/4608 |
| | | | | 206/194 |

(Continued)

*Primary Examiner* — J. Gregory Pickett
*Assistant Examiner* — Gideon Weinerth

(57) ABSTRACT

An apparatus may include a substrate material. The substrate material may lay substantially planar along a first axis. The apparatus may also include a plurality of punch-outs consisting of the substrate material and fastened to the substrate material. Each punch-out may be to be removed from the substrate material with an application of force upon each punch-out to create an open space in the substrate material. The apparatus may also include a first plurality of linear joints in the substrate material to allow the substrate material to be folded into a box form including at least five sides. The box form includes an inside portion.

20 Claims, 5 Drawing Sheets

(56) References Cited

U.S. PATENT DOCUMENTS

| | | | | |
|---|---|---|---|---|
| 4,269,348 A * | 5/1981 | Young | B65D 5/4616 | 229/115 |
| 4,530,459 A * | 7/1985 | Maroszek | B65D 5/46096 | 229/117.12 |
| 4,721,268 A * | 1/1988 | Lerner | H02G 11/02 | 191/12.2 R |
| 4,731,029 A | 3/1988 | Lerner et al. | | |
| 4,739,921 A * | 4/1988 | Taub | B65D 5/48024 | 229/120.32 |
| 4,858,846 A * | 8/1989 | McDonald | H02G 11/02 | 242/129 |
| 4,944,694 A * | 7/1990 | Dorn | H01R 13/72 | 439/501 |
| 5,372,225 A | 12/1994 | Joynes et al. | | |
| 5,425,499 A * | 6/1995 | Pfieffer | B65D 5/326 | 229/115 |
| 5,529,186 A * | 6/1996 | Bass | B65D 85/04 | 206/395 |
| 5,804,765 A | 9/1998 | Siemon et al. | | |
| 5,913,487 A * | 6/1999 | Leatherman | H02G 11/02 | 191/12.2 R |
| 5,917,694 A * | 6/1999 | Denny | A45D 1/00 | 206/372 |
| 5,924,892 A * | 7/1999 | Ferracina | H01R 13/72 | 439/501 |
| 6,017,228 A * | 1/2000 | Verbeek | A47B 21/06 | 174/493 |
| 6,103,973 A * | 8/2000 | Sharp | H02G 3/085 | 174/135 |
| 6,163,465 A | 12/2000 | Tanner et al. | | |
| 6,254,251 B1 | 7/2001 | Washington | B25H 3/02 | 362/154 |
| 6,305,388 B1 * | 10/2001 | Zeller | A45D 44/02 | 132/287 |
| 6,331,121 B1 * | 12/2001 | Raeford, Sr. | H01R 13/72 | 174/67 |
| 6,342,999 B1 | 1/2002 | Liao | | |
| 6,406,327 B1 * | 6/2002 | Soon | G06F 1/181 | 361/679.02 |
| 6,662,947 B2 * | 12/2003 | Lopez | B65D 71/36 | 206/147 |
| 6,793,523 B1 * | 9/2004 | Wei | H01R 13/72 | 439/501 |
| 6,844,494 B1 * | 1/2005 | Nevins | H01R 25/003 | 174/135 |
| 7,038,126 B2 | 5/2006 | Solet | | |
| 7,098,406 B1 * | 8/2006 | Hammonds | B65H 75/06 | 174/135 |
| 7,189,107 B1 * | 3/2007 | Strayer | H01R 13/72 | 439/501 |
| 7,589,957 B2 * | 9/2009 | Capuzza | H02J 7/0027 | 174/50 |
| 8,134,075 B1 * | 3/2012 | Vail | H02G 3/14 | 174/135 |
| 8,324,503 B2 | 12/2012 | Pastoriza et al. | | |
| 8,465,318 B2 * | 6/2013 | Kartes | H01R 13/465 | 439/501 |
| 8,522,969 B2 * | 9/2013 | Mason | A45D 44/06 | 206/234 |
| 8,553,407 B2 * | 10/2013 | Zhou | F16M 11/041 | 361/679.41 |
| 8,599,535 B2 * | 12/2013 | Loayza | B65H 57/16 | 174/135 |
| 8,668,160 B2 | 3/2014 | Cheng | | |
| 8,746,606 B1 * | 6/2014 | Murray | B65H 75/4471 | 242/129 |
| 2004/0104037 A1 * | 6/2004 | Solet | H02G 11/02 | 174/50 |
| 2005/0130492 A1 * | 6/2005 | Noh | H01R 13/72 | 439/501 |
| 2006/0201957 A1 * | 9/2006 | Harrington | H02G 3/085 | 220/787 |
| 2006/0249425 A1 * | 11/2006 | Law | B63B 17/00 | 206/702 |
| 2006/0264094 A1 * | 11/2006 | Young | H02G 11/02 | 439/501 |
| 2010/0163667 A1 * | 7/2010 | Dorais | B65H 49/325 | 242/587 |
| 2010/0172118 A1 * | 7/2010 | Loayza | B65H 57/16 | 361/826 |
| 2010/0320309 A1 * | 12/2010 | Galgano | B65D 5/5028 | 242/588.3 |
| 2010/0320310 A1 * | 12/2010 | McManus | B65D 5/5052 | 242/588.3 |
| 2011/0114715 A1 * | 5/2011 | House | B65D 5/2028 | 229/120 |
| 2012/0175408 A1 * | 7/2012 | Wang | B65D 5/68 | 229/115 |
| 2013/0206446 A1 | 8/2013 | Briede et al. | | |
| 2014/0097235 A1 * | 4/2014 | Adams | B65D 5/42 | 229/103 |
| 2014/0103790 A1 * | 4/2014 | Isaacks | H02G 3/00 | 312/326 |
| 2014/0262416 A1 * | 9/2014 | Conway | H05K 5/0247 | 174/59 |
| 2014/0263815 A1 * | 9/2014 | LaFontaine | B65H 49/322 | 242/594.5 |
| 2014/0332526 A1 * | 11/2014 | Blazberg | H02G 3/081 | 220/3.8 |
| 2015/0072552 A1 * | 3/2015 | Kim | H01R 25/003 | 439/501 |
| 2015/0166298 A1 * | 6/2015 | Ho | B65D 85/04 | 206/408 |
| 2015/0200528 A1 * | 7/2015 | Berger | H02G 11/02 | 439/501 |
| 2016/0006189 A1 * | 1/2016 | Morehead | H01R 13/518 | 439/501 |
| 2016/0104982 A1 * | 4/2016 | Ho | A47B 21/06 | 439/529 |

\* cited by examiner

ELECTRICAL WIRE ORGANIZATION DEVICE

RELATED APPLICATIONS

This application claims the benefit of U.S. Provisional Application No. 61/962,603, filed Nov. 12, 2013, the entire contents of which are hereby incorporated by reference herein in their entirety.

TECHNICAL FIELD

Embodiments of the present invention relate to the field of organization devices and, in particular, to an electrical wire organization device.

BACKGROUND

Electrical devices, such as televisions, computers, game consoles, audio equipment, network devices, and the like have become ubiquitous with modern society and modern living. Electrical devices typically include one or more electrical wires, such as power wires, co-axial cables, Ethernet cables, speaker wire, and so on. In addition, electrical devices often include associated material and devices such as manuals, warranties, receipts, remote controls and the like. The electrical devices may be in close proximity, include many electrical wires, and be interconnected by one or more shared electrical wires.

BRIEF DESCRIPTION OF THE DRAWINGS

The present invention is illustrated by way of example, and not by way of limitation, in the figures of the accompanying drawings.

DETAILED DESCRIPTION

Figure 1:
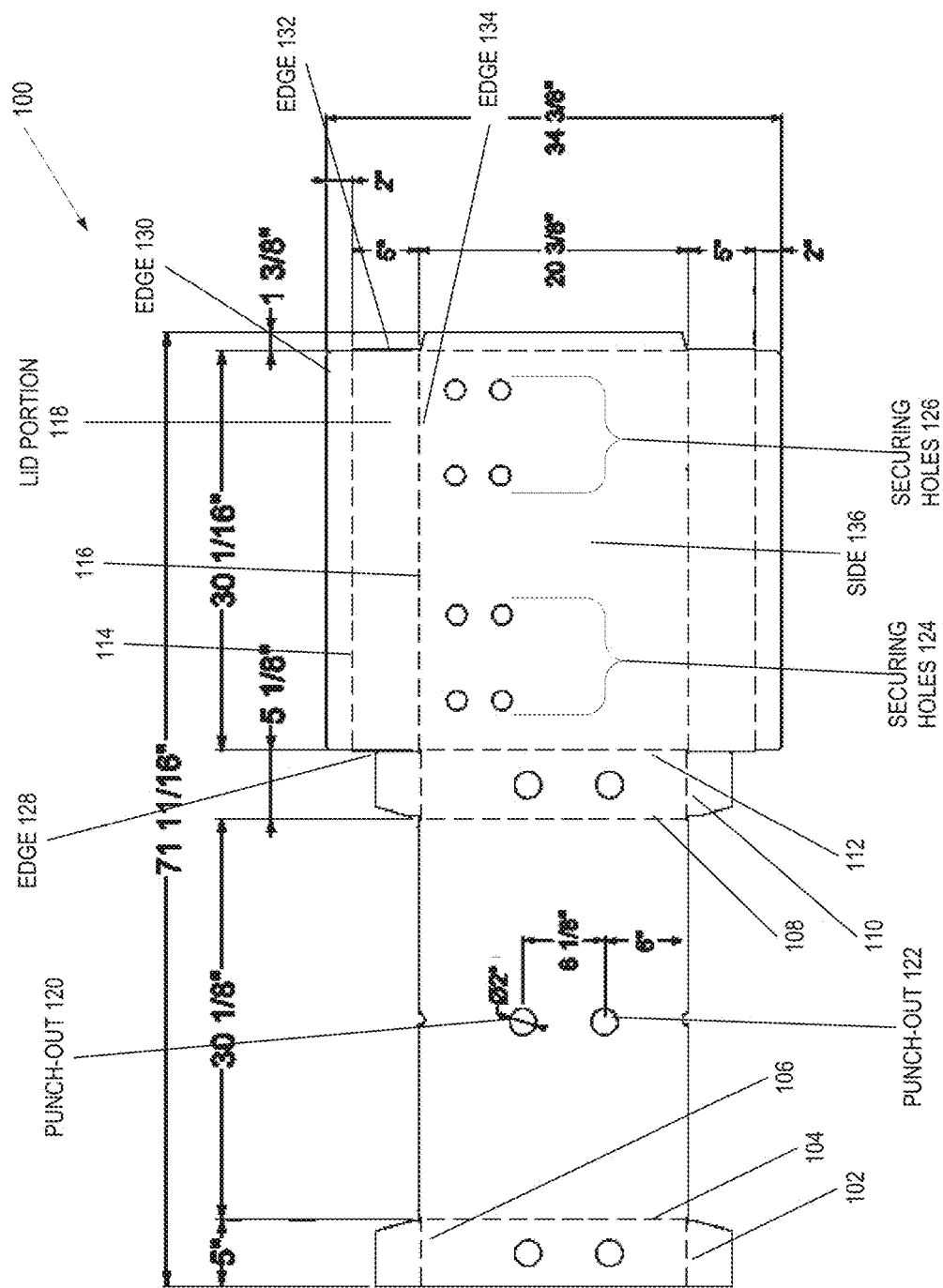
FIG. 1 illustrates a diagram of an exemplary substrate material laying substantially planar along an axis, in accordance with embodiments of the present invention.

Described herein is an apparatus for improving the storage of electrical wires associated with electrical devices. Electrical devices are ubiquitous with modern homes and offices. Each electrical device may have one or more associate electrical wires, such as power wires and associated cables. Electrical devices may be clustered in a particular location resulting in numerous electrical wires strewn behind and under electrical devices in a haphazard fashion. Furthermore, each electrical device may be associated with additional materials and devices such as manuals, warranties, receipts, control devices, auxiliary components, and the like. The additional materials often lack a dedicated storage space and may be misplaced or lost.

For example, the modern household may include an entertainment center. The entertainment center may have a television, audio equipment, a cable box, a gaming console, a networking device, and/or any other type of electrical device. The electrical devices may be clustered in an area such as around a television stand or other furniture. The electrical devices may be interconnected by numerous wires and cables. For example, the television may be connected to a power outlet by a power cable, and connected to the audio equipment and cable box by numerous wires and cables. The cables and wires may be placed behind the furniture, often tangled and collecting dust. The collection of cables and wires may also be visually unappealing. In addition to the electrical devices of the entertainment center, each device may have additional associated devices and/or materials. For instance, the gaming console may have controllers, a manual, a receipt of purchase, as well as auxiliary wires. Devices to store the electrical wires, associated materials, and/or associated devices (e.g., collectively called the electrical material), may be unavailable, inappropriate for the space, and/or inappropriate to store the electrical material. Additionally, devices to store the electrical material may be expensive and may not be configured into a form that is easy to store and/or ship.

In one embodiment, a substrate material may lay substantially planar along a first axis. For example, a cardboard material may be laid flat along a surface. The substrate material may include a plurality of linear joints that allow the substrate material to be folded into a box form. For example, the cardboard material may have one or more linear joints that allow the cardboard material to be folded in to a three-dimensional shape, such as a box form. The substrate material may include a plurality of punch-outs that may be fastened to the substrate material. The punch-outs may be removed from the substrate material with the application of force upon each punch-out to create an open space in the substrate material. For example, the substrate material may be perforated to form punch-outs. A user may apply a force to the punch-outs to remove the punch-outs from the cardboard. The punch-outs may be located at different areas on the cardboard allowing the user to choose to remove different punch-outs to meet needs specific to the user. When in a box form, one or more electrical wires may be stored in the inside portion of the box form. For example, excess electrical wire may be stored inside the box form. The ends of the wire may be thread through the open space created by removing the punch-outs, while the excess wire may be stored in the box form. Threading the ends of the wire through the open space may allow electrical wires to connect to associated electrical devices or other terminal points. The excess electrical wire typically stored behind the electrical devices may be stored inside the box form and out of view. The user may also remove different punch-outs to create additional open space for additional wires or open space at positions that facilitate a more advantageous location for threading the electrical wire to connect to an electrical device or other advantage determined by the user. The box form may be placed, for example, behind the entertainment center and be flush with the wall. The user may also re-configure the box form to lay the substrate material flat along a surface for example, to store the apparatus when not in use.

In another embodiment, the apparatus may include an inner tray. The inner tray may be configured to sit in the inside portion of the box form. The sides of the tray may be approximately flush with corresponding sides of the inside portion of the box form. For example, the box form may have a tray that fits securely inside the box form so that the inner tray rests in an upper portion of the box form and is accessible from a lid portion of the box form. A user may open the lid portion of the box form and store associated material and/or associated devices in the tray. The user may also lift the inner tray from the inside portion of the box form to access the excess cable or any other materials stored in the inside portion.

Embodiments described herein are discussed as electrical devices of a home entertainment center. However, it should be understood that embodiments may also apply to other types of electrical devices. Embodiments may apply to any type of electrical device that uses electricity and includes associated electrical wires. For example, embodiments may apply to desktop computer, servers, and so forth.

Embodiments described herein are discussed with reference to electrical wire, wire, and so forth. "Electrical wire", "wire", and the like herein shall refer to any type of wire and/or cable and/or cords that conduct an electric signal. Accordingly, embodiments may apply to all types of wires and cables, such as co-axial cables, power cables, universal serial bus (USB) cables, Ethernet cables, stereo cables, Radio Corporation of America (RCA) cables, general connection cables, and the like.

Embodiments described herein are discussed with reference to box form, box, and so forth. "Box form", "box", and the like herein shall refer to any three-dimensional (3D) shape with an inside portion capable to store electrical wire. Accordingly, embodiments may apply to boxes in a rectangular shape, triangular shape, or any 3D shape. Boxes may be constructed to approximately fit in a location where they may be used. For example, a rectangular box may be configured to fit behind a television stand. A triangular box may be configured to fit in a corner of a room, where one or more sides of the box may be adjacent to a wall or walls of a room.

Additionally, any dimensions associated with the present invention are for purpose of illustration only, and are not intended to be limiting. Dimensions of the present invention may be of any size and shape.

FIG. 1 illustrates a diagram of an exemplary substrate material laying substantially planar along an axis, in accordance with embodiments of the present invention. Substrate material 100 is shown laying substantially planar alone an axis (e.g., surface). In one embodiment, substrate material 100 may be corrugated cardboard. Substrate material 100 may be made from any material. Substrate material 100 may be any color, such as white, tan, black, etc. In another embodiment, substrate material 100 may be plastic. Substrate material 100 may include a plurality of linear joints, for example linear joint 102, linear joint 104, linear joint 106, linear joint 108, linear joint 110, linear joint 112, linear joint 114, and linear joint 116. Other linear joints in FIG. 1 may be illustrated by a dashed line. The linear joints, such as illustrated in FIG. 1, are intended for purposes of illustration, and not intended to be limiting. Substrate material may include one or more linear joints not shown in FIGS. 1-5 or not include one or more linear joints shown in FIG. 1-5. A linear joint may be a joint in substrate material 100 that allows a portion of substrate to fold in one or more directions. The linear joints may be contiguous with substrate material 100 made with the same material as substrate material 100 and/or be part of substrate material 100. The linear joints may allow substrate material 100 to be folded into a box form, as illustrated in FIG. 3, or be converted from box form back to laying substantially planar.

Returning to FIG. 1, substrate material 100 may also include a plurality of punch-outs, for example punch-outs 120 and 122. Other punch-outs in FIG. 1 may be illustrated as circles. The placement of punch-outs in FIGS. 1-5 is intended to be illustrative, and not intended to be limiting. Substrate material 100 may include one or more punch-outs not shown in FIGS. 1-5 or not include one or more punch-outs shown in FIG. 1-5. Punch-outs may be located anywhere on substrate material 100, be of any size, and/or be of any shape. In one embodiment, as illustrated in FIG. 1, the punch-outs may be of substantially circular shape. A punch-out may be comprised of substrate material 100 and fasten to the substrate material 100. Each punch-out may be configured to be removed from the substrate material 100 with an application of force upon each punch-out. The removal of a punch-out may create an open space in the substrate material 100. In one embodiment, substrate material 100 may be perforated to form one or more punch-outs. For example, a cardboard substrate material may be perforated at multiple locations to form multiple punch-outs. When a user intends to create an open space, for instance to thread an electrical wire through, a user may suitably press the punch-out causing the punch-out to be removed from the substrate material. The remaining open space in substrate material 100 may be used to thread wire in and out of the box form.

In one embodiment, the punch-outs may include a subset of punch-outs that include securing holes, such as securing holes 124 and securing holes 126. Each set of securing holes (e.g., securing holes 124 and securing holes 126) may include at least four securing holes. The securing holes may be used to secure a power strip (not shown) or other electrical device. A power strip may be an electrical device used to receive one or more power cords of an electrical device. A power strip may include a power cord that may be used to plug into a power source, such as power outlet, or the like. In one embodiment, a power strip may be secured in the inside portion of the box form of substrate material 100. The power strip may be secured to the box form using one or more securing strips thread through a pair of securing holes. A securing strip may be a strip of material with two ends, where the two ends may be fastened together to modify the length of the material. The power strip may be configured to receive electrical plugs of one or more electrical devices. One or more power strips may be secured to the box form. For instance, a power strip may be secured to securing holes 124 and another power strip may be secured to securing holes 126. Securing holes, such as securing holes 124 and 126, may be located anywhere on substrate material 100, be any shape, and/or be any size. In one embodiment, each securing hole of a set of securing holes (e.g., securing holes 124 and/or securing holes 126) may be substantially the same size and each measure approximately from one-sixteenth inch to one-half inch in diameter.

In one embodiment, substrate material may include a lid portion, such as lid portion 118. For purposes of illustration, lid portion 118 may be described as the top of substrate material 100 when in box form. It would be noted that a lid portion, such as lid portion 118, may be any side of substrate material 100. Lid portion 118 may be a side of substrate material 100 when configured in box form. Lid portion 118 may include at least three edges, such as edge 128, edge 130, edge 132, and edge 134. One edge, such as edge 134 may include a linear joint, such as linear joint 116, that connects to a side, such as side 136. Edge 128, edge 130, and edge 132 may be unconnected to any of the sides of the substrate material 100.

Figure 2:
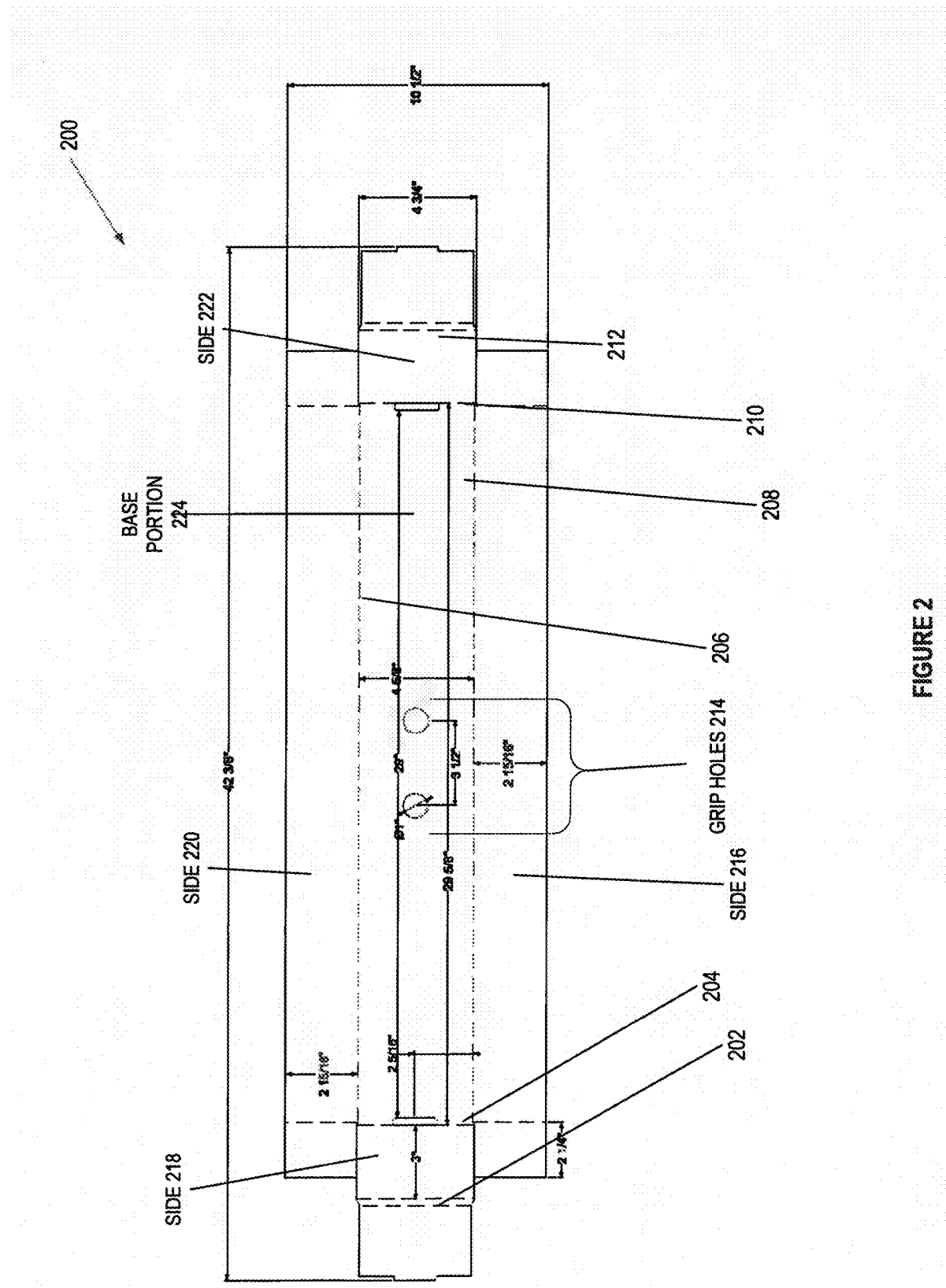
FIG. 2 illustrates a diagram of an inner tray, in accordance with embodiments of the present invention.
Figure 3:
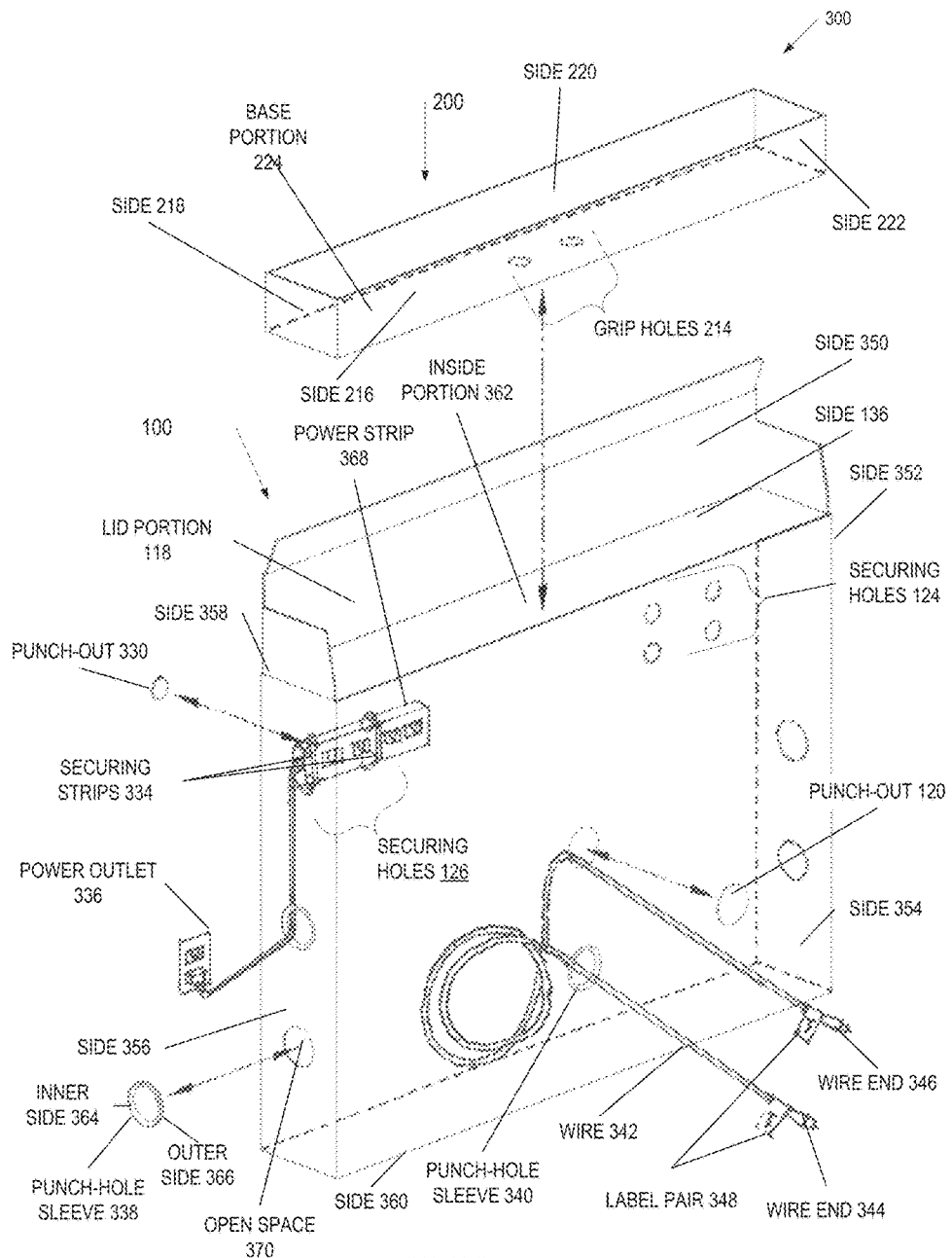
FIG. 3 illustrates a diagram of the exemplary substrate material of FIG. 1 in box form and the exemplary inner tray of FIG. 2 in tray form, in accordance with embodiments of the present invention.

FIG. 2 illustrates a diagram of an inner tray, in accordance with embodiments of the present invention. Inner tray 200 may lay substantially planar along an axis (e.g., surface), as illustrated. Inner tray 200 may include a plurality of linear joints, such as linear joint 202 linear joint 204, linear joint 206, linear joint 208, linear joint 210, and linear joint 212. Other linear joints in FIG. 3 may be illustrated by a dashed line. Linear joint of inner tray 200 may be substantially similar to the linear joints as described in reference to FIG. 1. The linear joint of inner tray 200 may be used to fold inner tray 200 into tray form, or convert tray form to a substantially planar surface. Tray form may have at four sides, such as side 216, side 218, side 220, and side 222 and a base portion, such as base portion 224.

When the inner tray is in tray form and the substrate material 100 is in the box form, the tray form may fit into the inside portion of the box form. The base portion 224 may planar to the lid portion 118 when in box form. Each side of inner tray in tray form may be approximately flush with a different side of the box form. For example, when inner tray 200 is in tray form and substrate material 100 is in box form, the inner tray 200 may be placed inside the box form. The tray form may be secured to the box form by friction or some other means and rest at a top portion of the box form. Inner tray 200 in tray form may be used to store associated material and associated devices. For example, receipts, manuals, video games, unused cords and wires may be stored in inner tray 200 and may be accessed by a user through lid portion 118. Associated material and associated devices may be any material or device stored in inner tray 200 in tray form and/or any material or device associated with an electrical device. Inner tray 200 may be made from any material such as corrugated cardboard or plastic In another embodiment, inner tray 200 may include one or more grip holes, such as grip holes 214. A grip hole may be formed by removing one or more punch-outs of inner tray 200, in a similar manner as discussed in reference to FIG. 1. Grip holes may be similar to punch-outs (or the removal of punch-outs) as discussed in reference to FIG. 1. Grip holes, such as grip holes 214, may be at any location on inner tray 200, any number, and/or any size. In one embodiment, each grip hole, such as grip holes 214, may be substantially the same size and measure approximately one-half inch to two inches in diameter.

FIG. 3 illustrates a diagram of the exemplary substrate material of FIG. 1 in box form and the exemplary inner tray of FIG. 2 in tray form, in accordance with embodiments of the present invention. Diagram 300 shows inner tray 200 in tray form (hereinafter "tray form") and substrate material 100 in box form (hereinafter "box form"). Box form includes six sides, side 136, side 350, side 354, side 356, side 358, and side 360. For purposes of illustration, box form may be described as oriented in a particular direction and/or manner, however the orientation is not intended to be limiting. Box form may be orientated in any direction. For example, side 350 (e.g., lid portion 118), may be considered the top. Side 358 (back) may orientated to be facing a wall. Side 354 (e.g., front) may be orientated to face the rear-portion of the electrical devices. It should be noted that the depth between the front and back of box form may be sufficiently narrow to fit behind a television stand or the like. Box form is shown to be folded along a plurality of linear joints to be configured into a box form. The linear joints may be formed into edges of the box form.

Box form includes securing holes 124 and 126, as illustrated in FIG. 1. Returning to FIG. 3, box form also includes a number of punch-outs, such as punch-out 330 and punch-out 120. Several of the punch-outs may be illustrated as being removed from the box form, such as punch-out 330 and punch-out 120. Removing a punch-out may create an open space such as open space 370.

In one embodiment, a punch-sleeve, such as punch-hole sleeve 338 and punch-hole sleeve 338 may be configure to fit in an open space of the box form (e.g., substrate material 100). For example, punch-hole sleeve 338 may fit into open space 370. A punch-hole sleeve may include an inner side, such as inner side 364, and an outer side, such as outer side 366. The punch-hole sleeve, such as punch-hole sleeve 340, may be configured to fit in the open space of the box form. The inner side may be fitted adjacent to the substrate material, as illustrated by punch-hole sleeve 340. The punch-hole sleeve may be made from a malleable material that may manipulated to fit in an open space and be secured by the substrate material surrounding the open space. In one embodiment, a punch-hold sleeve is plastic. The inner side of a punch-hole sleeve may be approximately smooth and/or enable an electrical wire, such as wire 342 to slide in an out of box form. The punch-hole sleeve may also add additional support to substrate material surrounding the open space so, for example, the substrate material does not tear and/or rip during use.

The box form may include an inside portion, such as inside portion 362. The inside portion may be accessed by at least adjusting (e.g., opening and closing) lid portion 118. The inside portion 362 may store an electrical wire, such as wire 342, of an electrical device. At least one end of wire 342 may exit the box form (e.g., inside portion 362) through an open space created by the removal of at least one punch-out. For example, wire end 346 and wire end 344 are illustrated as exiting inside portion 362, while an excess portion of wire 342 remains in the inside portion 362 of box form. Wire end 344 and/or wire end 346 may be pulled to a desirable length through each open space while the excess portion of wire 342 remains in the inside portion 362 of the box form.

In one embodiment, a label pair, such as label pair 348, may be provided. A label pair 348 may include at least two labels that may be used to identify two ends of the same wire and/or may be used to identify an end of a wire with a corresponding electrical device. A label pair 348 may be a set of at least two similar identifiers that may be attached at least to a wire and/or electrical device. Each label of label pair 348 may display similar identifiers, such as the same number, letter, symbol, or the like. Each label of label pair 348 may be fastened to a different end of the wire. For example, label pair 348, includes a similar identifier, the number one. Each of the labels of label pair 348 may be fastened to a different wire end of wire end 344 or wire end 346. Using a label pair, a user may identify two ends of the same wire while the excess portion of the wire is contained in inside portion 362. Label pair 348 may be made from any material, be any shape, and/or be any size. A label pair 348 may include two labels but also may include any number greater than two. A label pair 348 may be used several times and be removed from one wire and/or electrical device and re-used on another wire and/or electrical device. In another embodiment, one label of label pair 348 may attached to a wire end, such as wire end 346, while the other label of label pair 348 may be attached to the corresponding electrical device or corresponding port on an electrical device.

The inside portion 362 of box form may also include a power strip, such as power strip 368. Power strip 368 may be secured using securing holes 126 or securing holes 124. Power strip 368 is illustrated as being secured to the securing holes 126 in conjunction to with securing strips 334. Securing strips 334 may be used to fasten and/or secure power strip 368 to side 358 of box form. A securing strip may be a strip of material with two ends, where the two ends may be fastened together to modify the length of the material. Securing strips 335 may be tightened and loosened according to the user's preference. Securing strips 335 may be re-used. Securing strips 335 may be made from any material, be any size, and/or be any shape. Power strip 368 may plug into power outlet 336 by threading a power cord of power strip 368 through an open space. Power cords of one or more electrical devices may plug into power strip 368.

Tray form (e.g., inner tray 200) may fit in the inside portion 362 of the box form. The base portion 224 may be planar with the lid portion 118 (e.g., when closed). The sides of tray form, side 216, side 218, side 220, and side 222 may be approximately flush with the sides of the box form, side 354, side 356, side 358, and side 352, respectively. The friction between the inside sides of the box form and the tray form may secure the tray form in the upper portion of the box form (e.g., above securing holes 124 and 126). In another embodiment, tray form may be secured using other means such as cutouts in the box form and/or fasteners that prevent tray form from moving past a particular point in inside portion 362 of box form. Any number of devices and/or means may be used to secure tray form in place while in inside portion 362 of box form. Lid portion 118 may open and close to grant the user access to the inside portion 362 and/or tray form. The tray form may be used to hold associated devices and materials.

Figure 4:
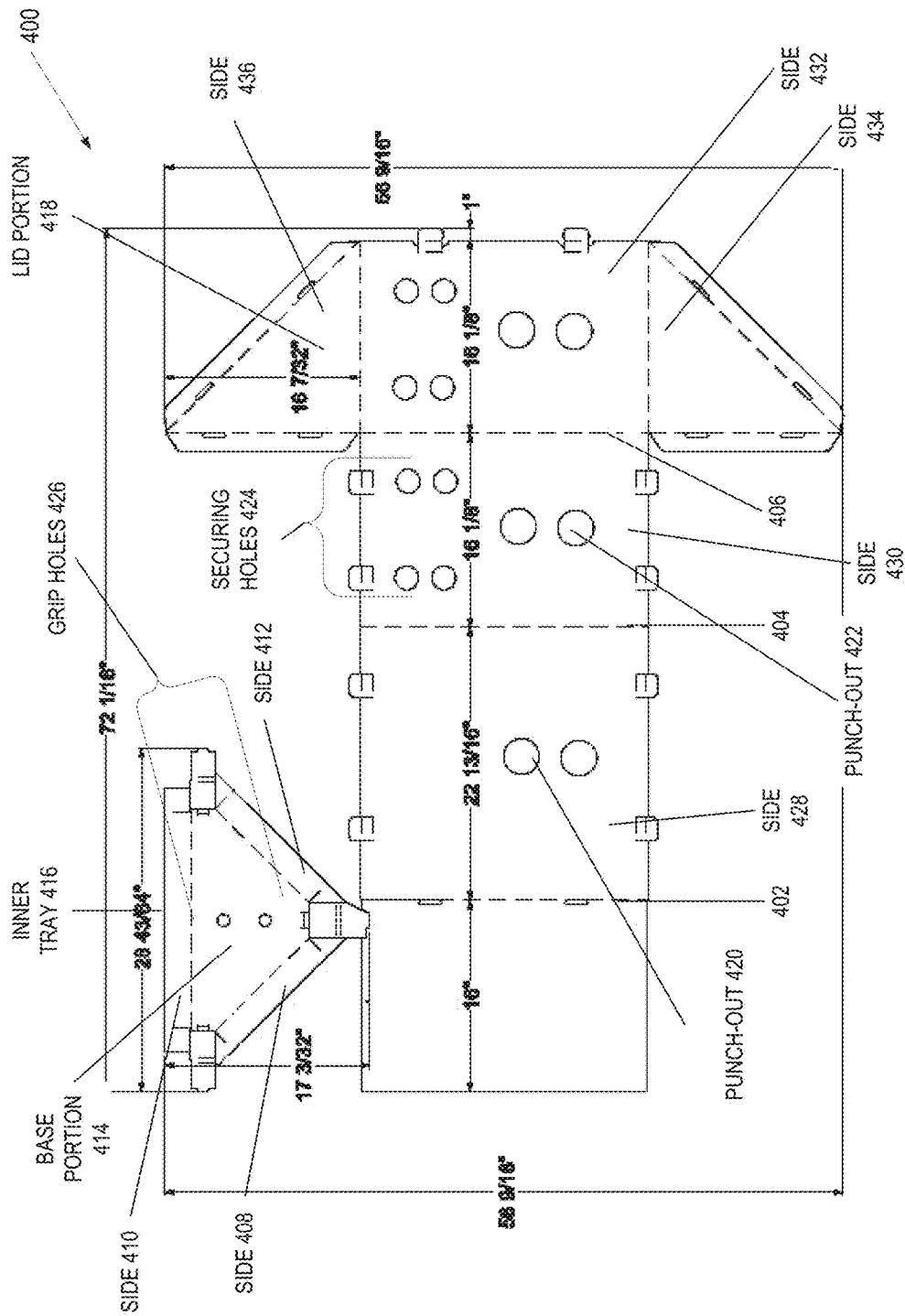
FIG. 4 illustrates another diagram of an exemplary substrate material laying substantially planar along an axis, in accordance with embodiments of the present invention.

FIG. 4 illustrates another diagram of an exemplary substrate material laying substantially planar along an axis, in accordance with embodiments of the present invention. Substrate material 400 may lay substantially planar along an axis, as illustrated in FIG. 4. Substrate material 400 may include a plurality of linear joint such as linear joint 402, linear joint 404, and linear joint 406. Other linear joints may be represented by dashed lines. Linear joint are further described in reference to FIG. 1.

Substrate material 400 may be folded into a box form by folding substrate material 400 at one or more of linear joints, such as linear joint 402, linear joint 404, and linear joint 406. The box form of substrate material 400 may be a substantially triangular shape. The sides of the box form of substrate material 400 (hereinafter, triangular box form) include side 428, side 430, side 432, side 434, and side 436. For purposes of illustration, side 436 may be the top portion of triangular box form. Substrate material 400 may be made of any material, such as corrugated cardboard. Substrate material 100 may be any color, such as white, tan, black, etc.

Substrate material 400 may also include punch-outs, such as punch-out 420 and punch-out 422. Punch-outs of substrate material 400 may further be described in reference to FIGS. 1-3. A subset of the punch-outs, when removed from the substrate material, may create securing holes, such as securing holes 424. Securing holes of substrate material 400 may be further described in reference to FIGS. 1-3. Substrate material 400 may also include a lid portion 418. Features of substrate material 400 may be substantially similar to features described in reference to substrate material 100 of FIG. 1.

In one embodiment, inner tray 416 may be part of substrate material 400. Inner tray 416 may be fastened to substrate material and configured to be removable from the substrate material with the application of force. Inner tray 416 may include side 408, side 410, side 412, and base portion 414. Inner tray 416 may also include grip holes 426. Inner tray 416 may be folded along linear joint to form a tray form. The tray form of inner tray 416 may be substantially triangular and fit in an inside portion of triangular box form. Features of inner tray 416 may be substantially similar to features described in reference to inner tray 200 of FIG. 2.

Figure 5:
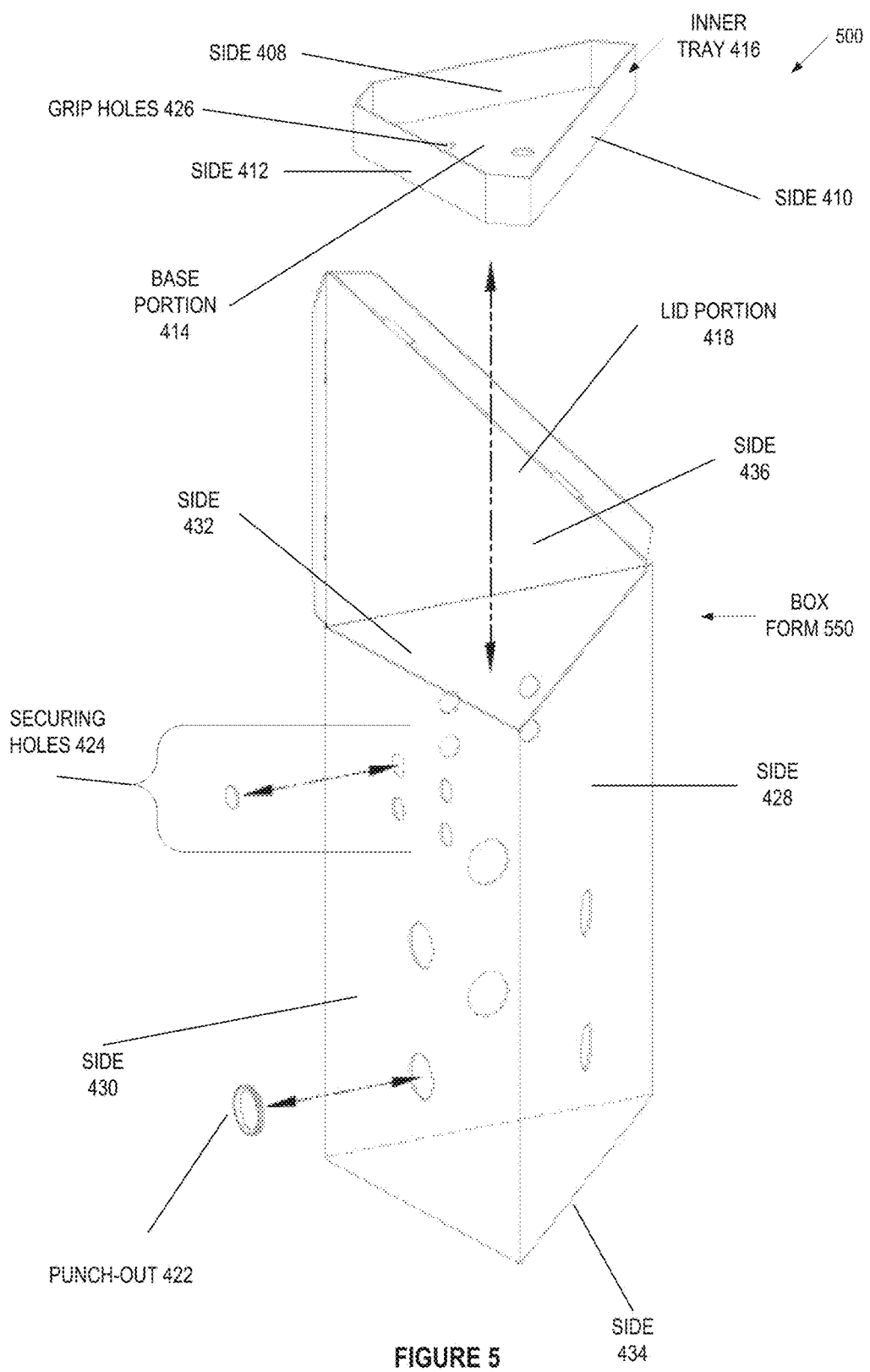
FIG. 5 illustrates a diagram of the exemplary substrate material of FIG. 4 in box form, in accordance with embodiments of the present invention.

FIG. 5 illustrates a diagram of the exemplary substrate material of FIG. 4 in box form, in accordance with embodiments of the present invention. Diagram 500 may include inner tray 416 in tray form (hereinafter, tray form) and substrate material 400 in box form 550. The box form 550 and tray form may be substantially triangular. Diagram 500 may include similar features as described in reference to FIG. 1-3.

Box form 550 includes five sides, side 428, side 430, side 432, side 434, and side 436. For purposes of illustration, box form 550 and tray form may be described as oriented in a particular direction and/or manner, however the orientation is not intended to be limiting. Box form may be orientated in any direction. For example, side 436 (e.g., lid portion 418), may be considered the top. Side 432 and side 430 may be at approximately 90 degrees and may align with a corner where two walls meet. Side 432 and side 430 may be at any angle to one another. Side 428 (e.g., front) may be orientated to face the rear-portion of the electrical devices. Box form 550 is shown to be folded along a plurality of linear joints to be configured into a box form. The linear joints may be formed into edges of the box form. Box form 550 may include securing holes 424. Punch-out 422 is shown to be removed leaving an open space.

Tray form of inner tray 416 has three sides and a base portion, side 408, side 410, side 412, and base portion 414. Tray form may be configured to fit within box form 550. A user may access tray form by opening lid portion 418. In one embodiment, lid portion 418 may be removable and not be connected to box form 550. Tray form of inner tray 416 may include features substantially similar to features discussed in reference to the tray form of FIG. 3.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. An apparatus comprising:
a substrate material laying substantially planar along a first axis;
a plurality of punch-outs comprised of the substrate material and fastened to the substrate material, each punch-out configured to be removed from the substrate material with an application of force upon each punch-out to create an open space in the substrate material;
a first plurality of linear joints of the substrate material configured to allow the substrate material to be folded into a box form comprising six sides, wherein the box form is a rectangular shape, wherein the box form comprises an inside portion, a lid portion, a bottom portion, a front portion, a back portion, a first side portion, and a second side portion, wherein each of the front portion, the first side portion, and the second side portions comprises at least a pair of punch-outs of the plurality of punch-outs;
an inner tray configured to lay substantially planar along the first axis; and a second plurality of linear joints of the inner tray, wherein the second plurality of linear joints are configured to allow the inner tray to be folded into a tray form, wherein the tray form comprises four sides and a base portion, wherein the lid portion of the box form opens to expose the inside portion of the box form, wherein the tray form is configured to be placed in the exposed inside portion of the box form, wherein the tray form is configured to fit in the inside portion of the box form adjacent to the lid portion, wherein each of the four sides of the tray form are approximately flush with a corresponding one of the back portion, the front portion, the first side portion, and the second side portion of the box form when fit in the inside portion of the box form, wherein the tray form is secured and held adjacent to the lid portion by a friction fit, wherein the friction fit is to keep the tray form adjacent to the lid portion rather than allow tray form to slide in a downward direction in the inside portion of the box form, wherein the base portion of the inner tray comprises a plurality of grip holes formed by removing a set of punch-outs associated with the inner tray.

2. The apparatus of claim 1, wherein the inside portion of the box form is to store a wire of an electrical device, and wherein at least a first end or a second end of the wire exit the box form through the open space created by removal of at least one punch-out of the plurality of punch-outs from the substrate material.

3. The apparatus of claim 1, further comprising:
a punch-hole sleeve comprising an inner side, an outer side, and an open portion surrounded by the inner side, the punch-hole sleeve configured to fit in the open space of the substrate material, wherein the punch-hole sleeve to provide support for the substrate material adjacent the open space and maintain the open space of the substrate material, wherein the inner side is smooth, and wherein the outer side is configured to fit flush with an outer portion and the inner portion of the substrate material proximate to and surrounding the open space.

4. The apparatus of claim 1, further comprising:
the lid portion of the substrate material, wherein the lid portion comprises four edges, wherein a first edge of the four edges comprises a first linear joint of the first plurality of linear joints and connects to the back portion of the box form, and wherein a second edge, a third edge, and a fourth edge of the four edges are unconnected to any side of six sides of the box form.

5. The apparatus of claim 1, wherein a subset of the plurality of punch-outs, when removed from the substrate material, create a set of securing holes comprising at least four securing holes, the set of securing holes to secure a power strip.

6. The apparatus of claim 5, further comprising
a plurality of securing strips, each of the plurality of securing strips to thread through two securing holes of the set of securing holes to secure the power strip to the inside portion of the box form.

7. The apparatus of claim 1, wherein the substrate material is corrugated cardboard.

8. The apparatus of claim 1, wherein the substrate material is plastic.

9. The apparatus of claim 1, wherein the plurality of punch-outs are formed by perforating the substrate material.

10. The apparatus of claim 1, wherein each of the plurality of punch-outs is a substantially circular shape.

11. The apparatus of claim 1, wherein the box form is a substantially triangular shape.

12. The apparatus of claim 2, further comprising
a label pair, each label of the label pair displaying substantially similar identifiers, each label of the label pair to be fastened to a different end of the first end or the second end of the wire or be fastened to the first end of a wire while the other of the each label is fastened to a corresponding electrical device.

13. The apparatus of claim 3, wherein the punch-hole sleeve is plastic.

14. The apparatus of claim 1, wherein the inner tray is corrugated cardboard.

15. The apparatus of claim 1, wherein the inner tray is part of the substrate material and fastened to the substrate material, the inner tray configured to remove from the substrate material with the application of force.

16. The apparatus of claim 1, wherein each grip hole of the plurality of grip holes is substantially a same size and measures approximately between one-half inch to two inches in diameter.

17. The apparatus of claim 5, wherein each securing hole of the set of securing holes is substantially a same size and measures approximately from one-sixteenth inch to one-half inch in diameter.

18. An apparatus comprising:
a substrate material laying substantially planar along a first axis;
a plurality of punch-outs comprised of the substrate material and fastened to the substrate material, each punch-out configured to be removed from the substrate material with an application of force upon each punch-out to create an open space in the substrate material;
a first plurality of linear joints of the substrate material configured to allow the substrate material to be folded into a box form comprising five sides, wherein the box form is a triangular shape, wherein the box form comprises an inside portion, a lid portion, a bottom portion, a front portion, a first side portion, and a second side portion, wherein each of the front portion, the first side portion, and the second side portions comprises at least a pair of punch-outs of the plurality of punch-outs;
an inner tray configured to lay substantially planar along the first axis; and
a second plurality of linear joints of the inner tray, wherein the second plurality of linear joints are configured to allow the inner tray to be folded into a tray form, wherein the tray form comprises three sides and a base portion, wherein the lid portion of the box form opens to expose the inside portion of the box form, wherein the tray form is configured to be placed in the exposed inside portion of the box form, wherein the tray form is configured to fit in the inside portion of the box form adjacent to the lid portion, wherein each of the three sides of the tray form are approximately flush with a corresponding one of the front portion, the first side portion, and the second side portion of the box form when fit in the inside portion of the box form, wherein the tray form is secured and held adjacent to the lid portion by a friction fit, wherein the friction fit is to keep the tray form adjacent to the lid portion rather than allow tray form to slide in a downward direction in the inside portion of the box form, wherein the base portion of the inner tray comprises a plurality of grip holes formed by removing a set of punch-outs associated with the inner tray.

19. The apparatus of claim 18, further comprising:
a punch-hole sleeve comprising an inner side, an outer side, and an open portion surrounded by the inner side, the punch-hole sleeve configured to fit in the open space of the substrate material, wherein the punch-hole sleeve to provide support for the substrate material adjacent the open space and maintain the open space of the substrate material, wherein the inner side is smooth, and wherein the outer side is configured to fit flush with an outer portion and the inner portion of the substrate material proximate to and surrounding the open space.

20. The apparatus of claim 18, wherein the inner tray is part of the substrate material and fastened to the substrate material, the inner tray configured to remove from the substrate material with the application of force.

* * * * *